United States Patent [19]
Valyi

[11] 3,954,923
[45] May 4, 1976

[54] METHOD OF MAKING COMPOSITE PLASTIC ARTICLE

[76] Inventor: Emery I. Valyi, 5200 Sycamore Ave., Riverdale, N.Y. 10471

[22] Filed: Oct. 4, 1974

[21] Appl. No.: 511,982

Related U.S. Application Data

[62] Division of Ser. No. 277,070, Aug. 2, 1972, abandoned.

[52] U.S. Cl. .................... 264/94; 264/37; 264/89; 264/92; 264/97; 264/138; 264/157; 264/163; 264/251; 264/254; 264/266
[51] Int. Cl.² .................. B29C 5/06; B29C 5/08
[58] Field of Search .............. 264/259, 245–247, 264/88, 90, 92, 93, 94, 97, 157, 154, 160, 163, 37, 251, 266, 297, 254, 138, 328, 250, 291

[56] References Cited
UNITED STATES PATENTS

| 2,962,758 | 12/1960 | Politis | 264/297 |
| 3,240,851 | 3/1966 | Scalora | 264/163 |
| 3,283,045 | 11/1966 | Thiel | 264/296 |
| 3,475,526 | 10/1969 | Seto | 264/163 |
| 3,527,854 | 9/1970 | Martin et al. | 264/92 |

FOREIGN PATENTS OR APPLICATIONS

| 46-29980 | 8/1971 | Japan | 264/97 |

Primary Examiner—Willard E. Hoag
Attorney, Agent, or Firm—Robert H. Bachman

[57] ABSTRACT

An improved method of transferring liners to a blow core in a method of making a composite plastic article wherein a plastic parison is formed in a parison mold around and in conformity with a blow core, the parison, sleeve and core being subsequently confined in a blow mold and expanded therein. In accordance with a method of preparing composite liners, scrap produced in the preparation thereof may readily be reclaimed.

5 Claims, 5 Drawing Figures

U.S. Patent  May 4, 1976  Sheet 1 of 2  3,954,923
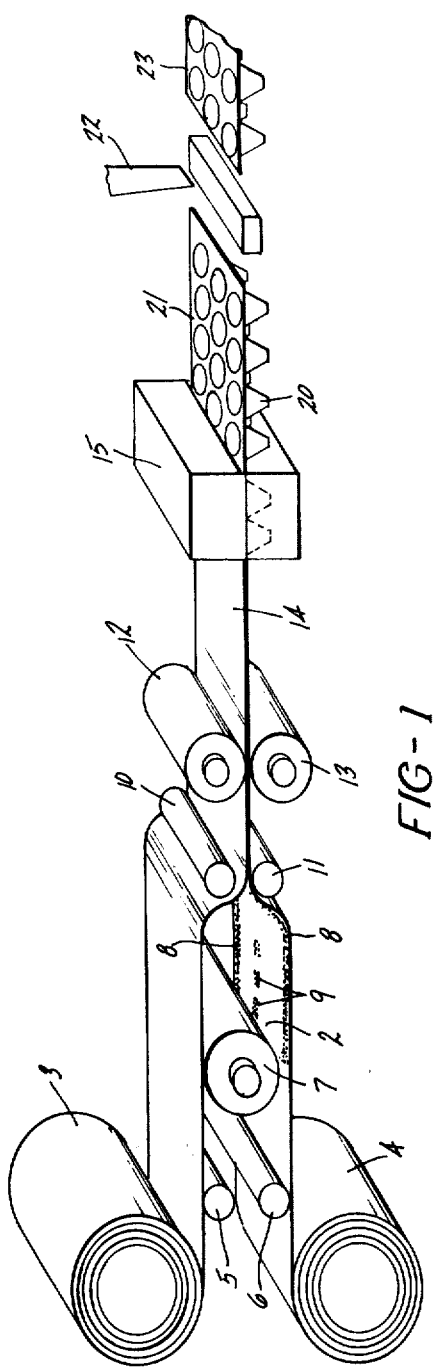
FIG-1
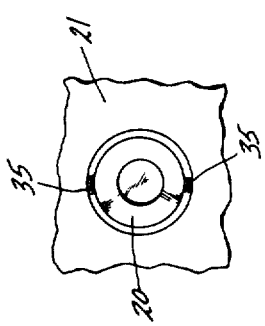
FIG-3
FIG-2
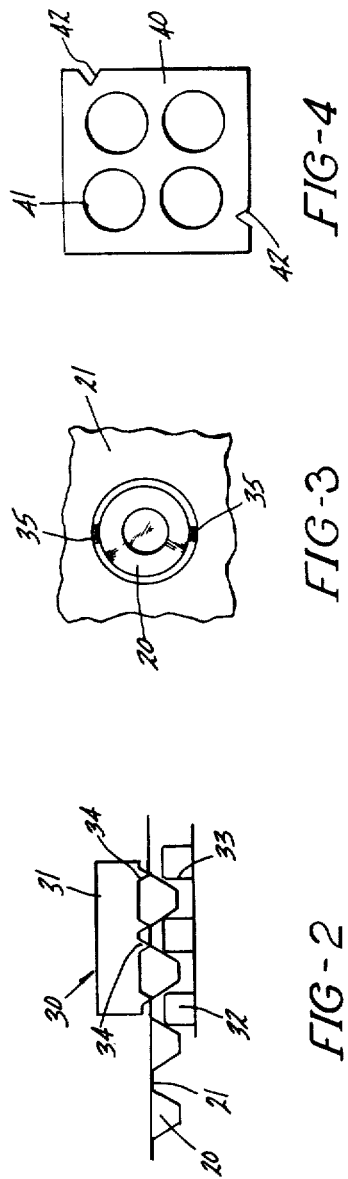
FIG-4

3,954,923

METHOD OF MAKING COMPOSITE PLASTIC ARTICLE

This is a division, of application Ser. No. 277,070, filed Aug. 2, 1972 and now abandoned.

BACKGROUND OF THE INVENTION

The invention relates to the art of blow molding wherein a composite plastic article is formed by preparing a plastic parison in a parison mold around and in conformity with a blow core, with a preformed sleeve or liner between the parison and the core, the parison, sleeve and core being subsequently confined in a blow mold and expanded therein, such as disclosed in my copending U.S. Pat. application Ser. No. 71,734, filed Sept. 14, 1970, now U.S. Pat. No. 3,717,544.

The plastic liners may be conveniently formed by thermoforming, in a manner well known in the art. However, a serious problem is encountered in transferring the liners from a thermoforming machine to a remote point of use, that is, to an injection blow molding machine. This problem is particularly difficult to solve when, as is generally the case, the thermoforming operation is conducted at a location remote from the injection blow molding machine and when the liners are fragile or easily deformable. My copending U.S. Pat. application Ser. No. 211,314, now U.S. Pat. No. 3,768,940 filed Dec. 23, 1971, describes a method and apparatus for transferring a preformed liner at the location of the injection blow molding machine to the blow core prior to the molding of the parison in the parison mold. This is accomplished by a device for transferring the liner from the blow mold to the path of the blow core prior to the molding of the parison in the parison mold. This is a particularly ueful method and apparatus; however, this does not solve the problem of transferring the liners from a remote thermoforming machine to the injection blow molding machine.

An additional problem is encountered in the preparation of composite liners, such as liners comprising several layers of different plastics, which are contemplated by said copending application Ser. No. 71,734. Any thermoforming operation generates appreciable amounts of scrap, which may or may not be reusable depending upon its composition and particularly also depending on whether it is composed of a single plastic or of several plastics having different compositions. If the composite scrap cannot be separated into its original components, then, upon reuse, such as by grinding and re-extruding, an inferior product is obtained. In any event, reprocessing, as by grinding and re-extruding, adds appreciably to the cost and inconvenience. If, in addition, it results in a inferior product, as in the case of inseparable composites, it provides an uneconomical burden on the product.

Accordingly, it is a principal object of the present invention to provide a convenient and economical method of transferring liners from point of preparation to an injection blow molding machine.

It is an additional object of the present invention to provide a method of preparing composite liners which enables economical scrap reclamation.

It is a further object of the present invention to enable the convenient transfer of liners as aforesaid, while retaining the ability to economically reclaim the liner scrap.

Further objects and advantages of the present invention will appear hereinafter.

SUMMARY OF THE INVENTION

In accordance with the present invention, it has now been found that the foregoing objects and advantages may be readily obtained. In fact, the present invention contemplates a single method which readily achieves all the foregoing objects and advantages. Thus, the method comprises: providing layers of plastic material in intimate, contacting relationship; at least partially sealing said layers together to form a sheet-like composite; thermoforming said sheet-like composite to form a plurality of cup-like composites on a web of said sheet-like composite; at least partially severing said cup-like composites from said web, while supporting said cup-like composites on a support member; transferring said supported cup-like composites for further processing; and separating the unsealed layers into their component parts.

In a broader sense, the present invention contemplates an improved method of transferring liners to a blow core providing that said liners are incompletely connected to a web of material and subsequently separating said liners from said web by said injection blow molding apparatus. The present invention also comprises an improved method of preparing a composite liner which enables the convenient reclamation of scrap generated in the preparation thereof. The present invention contemplates further an apparatus which is useful in the preparation of lined composite plastic articles in an injection blow molding system.

BRIEF DESCRIPTION OF THE DRAWINGS

FIG. 1 is a semi-diagrammatic perspective view of the preparation of composite liners.

FIG. 2 is an elevational view showing the severing of the liners from the web.

FIG. 3 is a partial top view showing a liner partially severed from the web.

FIG. 4 is a top view showing a transfer plate for carrying severed liners.

DESCRIPTION OF THE PREFERRED EMBODIMENTS

Figure 5:
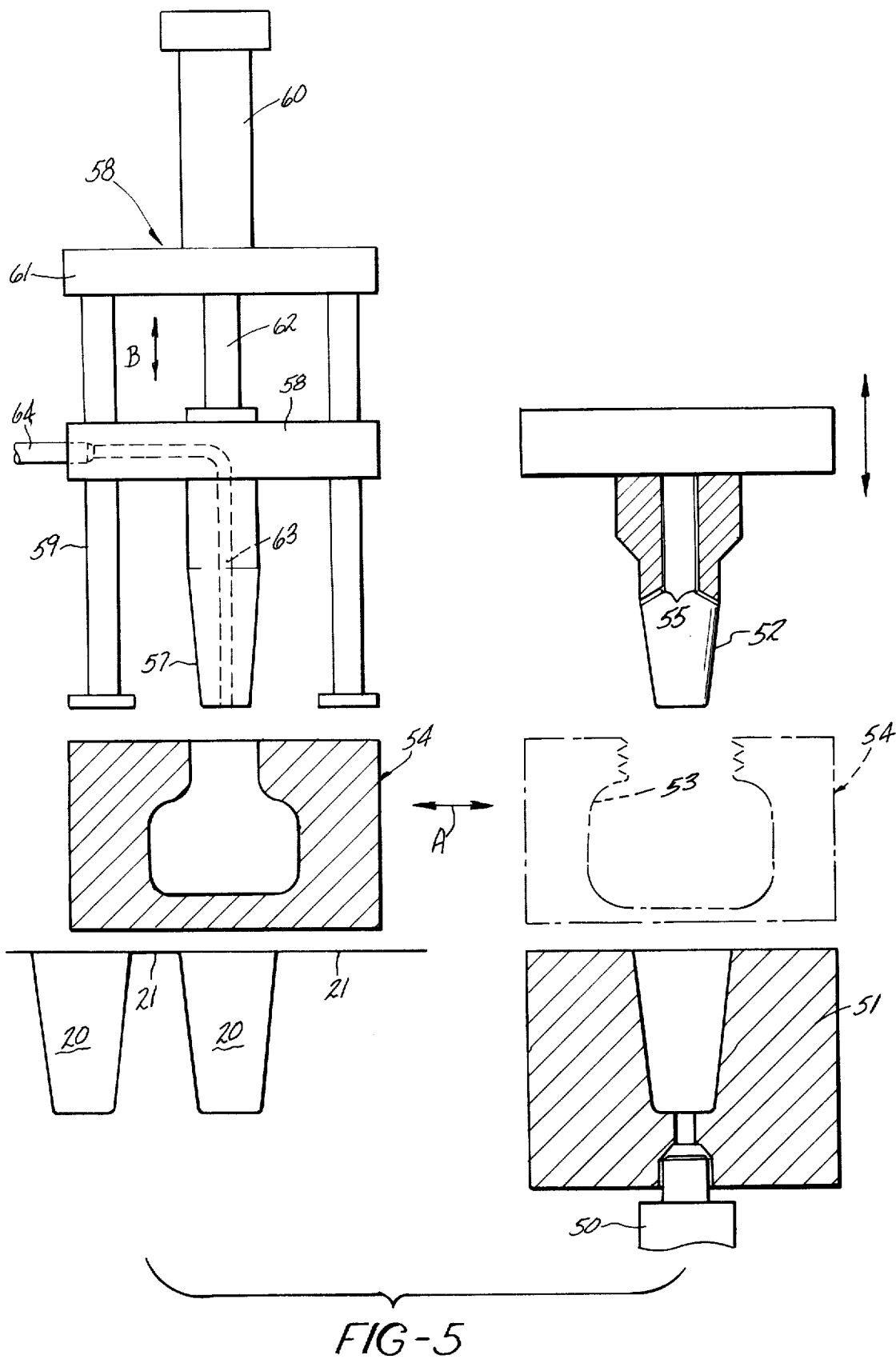
FIG. 5 is an elevation, partly in section, of an injection blow molding apparatus, including means for separating the liner from the web and transferring same to the blow core.

Referring to the drawings, FIG. 1 shows the preparation of composite liners in accordance with one embodiment of the present invention. Component plastic strips or sheets 1 and 2 are unwound from coils 3 and 4, respectively. Guide roll 5 is provided for guiding sheet 1 and guide roll 6 for guiding sheet 2. Means 7 are provided for selectively applying adhesive 8 to either sheet 1 or sheet 2 or both sheets 1 and 2 to preselected portions thereof, as at their marginal edge portions, so that sheets 1 and 2 will be selectively bonded. Alternatively, the adhesive applying means may apply the adhesive at spaced points on sheet 1 or sheet 2 or both sheet 1 and sheet 2 as at 9, corresponding to the locus of formation of the ultimate article as will be seen hereinafter. Naturally, sheets 1 and/or 2 may have adhesive applied to both the marginal edge portions 8 and at spaced points 9, if desired. The adhesive applying means 7 may function in a manner known in the art, as by containing an adhesive reservoir and annular orifices for the application of the adhesive to the sheets, not shown. Alternatively, in place of or in addition to the adhesive applying means, one may heat seal the webs at preselected portions thereof. Thus, the marginal edge portions 8 and spaced points 9 may be selectively bonded by other means known in the art, such as heat sealing, in which case means 7, instead of applying adhesive, heats selected portions of sheet 1 and/or sheet 2.

Sheets 1 and 2, having adhesive applied thereon, or being otherwise prepared for bonding, are then fed through guide rolls 10 and 11, which serve to remove all air from between component sheets, and pressure rolls 12 and 13, which apply a light pressure to the sheets, transforming them into a single plastic sheet 14 having discrete portions of plastic partially sealed one to the other.

Sheet 14 is then fed into a thermoforming apparatus 15 of known construction which thermoforms a plurality of cup-like articles 20. Such well known apparatus, not shown in detail, consists, for example, of a heating oven to heat the sheet 14 to formable temperature and of a press in which selected portions of the sheet 14 are drawn into the desired shape through dies, by means of plugs, all according to conventional practice.

Cup-like articles 20 are carried on a web 21 of composite plastic material. Cutting means 22 may then be provided to separate the cupped web into shorter sections 23 of any predetermined length.

Thus, it can be readily seen that the resultant composite web has a plurality of layers of plastic material partially sealed together and a plurality of cup-like articles projecting out of at least one face thereof. The cups are particularly suitable for use as liners in a blow molded composite plastic article and hence should have a substantial longitudinal dimension. Preferably, the cups project in the same direction. Hence, the composite web contains a cupped portion and a skeleton scrap portion, with the layers of plastic material forming the skeleton scrap portion being substantially unsealed.

The unsealed portions may be readily separated into their component parts after removal of the cupped portions and therefore inexpensively and conveniently recycled. This is particularly significant where the components would be completely lost if fully bonded. For example, it is frequently necessary to provide a combination of properties in the liner itself that one plastic alone cannot provide readily. For example, if an acrylonitrile polymer is to be used, because of its barrier properties ($O_2$, or $CO_2$) and if, at the same time diffusion of water vapor is to be prevented, the web from which the liner, i.e., the cup-like article, is to be made would be composed of a laminate of acrylonitrile and a polyolefin. The skeleton scrap remaining in the process of producing such a liner would not be reuseable in producing more of the acrylonitrile barrier and, therefore, its costly acrylonitrile content would be lost. The two layers of such a liner, or, in other cases, the several layers, must of course be made to adhere to each other; the procedures now available to vouchsafe such adhesion will produce a web that adheres over its entire extent and, therefore, any skeleton scrap produced from it has the disadvantage discussed above. Such procedures include, for example, co-extrusion, total bonding by means of an adhesive, etc.

If the components are bonded only at their peripheral edge portions, the resultant sealed portions may be trimmed off, permitting the remainder of the skeleton scrap to be separated into its components. In this embodiment, the thermoforming operation above is relied upon effectively to bond the unbonded layers in the process of forming the cups. For such practice to succeed, it is important to remove the air from between the layers of the laminate as by rolls 10 and 11, in order to prevent the layers of the cups from separating into their component parts, since, with the air removed from between the layers, atmospheric pressure effectively holds them together. This is especially true where the layers are only peripherally bonded. If the components are bonded only at the locations that serve to form the cups, then the layers of the cups will obviously be bonded, with the remainder of the web becoming separable upon trimming out of the cups 20 from web 21. In such cases the edge portions may occasionally be bonded as well, but only to facilitate guiding of the sheet 14 in the thermoforming apparatus.

Naturally, one may readily contemplate many modifications of the foregoing. For example, the selective application of adhesive may be carried out by known methods of printing. It may be more convenient to utilize a discontinuous operation, rather than a continuous operation as shown. The cup-like liners are used to inject plastic therearound, to form composite parisons, as described in my aforementioned copendng applications. If it is desired to enhance the adhesion of the liners to the injected portions of the parisons, the outside surface of the liners may be provided with an adhesive, by applying such adhesive to the formed cup-like liners, or by applying it to the corresponding locations of the sheet 14. In such instance, the adhesive may be chosen to act only when heated, such as by the injected plastic, rather than at room temperature, so that sticking together of liners during transportation and handling may be prevented.

The liners are then transferred to the blow molding apparatus, which is generally at an entirely different location. The liners may be transferred using the web section as a carrier, in which case it is particularly convenient to partially sever the cup shaped liners from the web as shown in FIGS. 2 and 3. FIG. 2 represents a trimming tool 30 for use in either trimming the cups out of the web or partly trimming or scoring the cups. The trimming tools may have moveable platens 31 and 32 having cup holding means 33 and cutting, or trimming means 34. The cups and web 20 and 21, respectively, are indexed into the cup holding means 33, platens 31 and 32 are closed forcing cutting or trimming means 34 to cut or partially sever cups 20 from web 21. FIG. 3 shows a cup partially severed from a web leaving tab portions 35 which serve to partially connect the cup to the web. The tabs may be easily broken when desired, so that the web can be conveniently removed for scrap reclamation after serving the function of a support means for the cups. If desired, the tabs may be broken by means associated with the blow molding apparatus, as will be shown hereinafter, or by a special means provided for this purpose, or manually. Naturally, the size, location and number of the tab portions may be varied depending upon the circumstances, such as cup configuration, whether round, oval or square, and ease of separation desired.

Alternatively, the cups may be completely removed and immediately or subsequently pushed or placed into carrier or transfer plate 40 having a plurality of spaced openings 41 therein for carrying the cups in a desired configuration corresponding to the configuration of the injection molding and blow molding tools. To assure proper alignment of the transfer plate 40, first with the trimming tool and then with the injection tool, registering means may be used, such as notches 42. The transfer plates are, of course, returned to the trimming press for reuse once the liners have been transferred from them.

The web portion may then be recycled. If the web portion is a composite, as discussed hereinabove, the unbonded portions may be readily separated for convenient recycling, providing a considerable economic advantage. If either a composite or a monolithic liner and web are used, the partial severing or transfer plate technique provides a highly advantageous means for transferring the liners to the injection blow moldng apparatus, inexpensively and conveniently, while minimizing the likelihood of damage to fragile liners.

The liners plus support means are then transferred for use in an injection blow molding apparatus. Naturally, a wide variety of injection blow molding configurations may be employed. FIG. 5 herein simply represents a preferred embodiment which is contemplated in accordance with the present invention.

Thus, FIG. 5 shows the elements of an injection blow molding machine adapted to produce composite containers, wherein hot, flowable plastic is injected through nozzle 50 into a parison mold 51 when blow core 52 is in a position to provide a closed mold cavity in combination with the parison mold. In order to bring the blow core into that position, it is arranged to be moveable in the direction of the vertical arrow, by conventional means, not shown. Prior to insertion of the blow core 52 into parison mold 51, the liner 20 is applied to the blow core in a manner to be described below.

Upon placing the blow core, with the liner thereon, into molding position in parison mold 51, plastic is injected and the liner is heated by the hot plastic flowing into the mold, and optionally also the blow core itself may be heated for that purpose, as by conventional fluid circulation, or electrically. A composite parison is thus formed, composed of an inner layer corresponding to liner 20 and an outer layer of freshly injected plastic. While still at a sufficiently elevated temperature for extensive deformation, the composite parison on the blow core is placed into the cavity 53 of blow mold 54. For that purpose, blow mold 54 may be moved in the direction of horizontal arrow A so that it is in alignment with the blow core as indicated by the dot-dash lines in FIG. 5. Upon insertion of the blow core, carrying the composite parison thereon, into the blow mold, fluid is injected through blow slot 55 of the blow core and the composite parison is expanded into conformity with the blow mold cavity 53. The blow core is removed from the blown article in the blow mold and the blow mold with the article therein returned to the discharge position as shown in full lines in FIG. 5, that is, away from the path of the blow core, so that the finished article may be removed without interfering with subsequent movements of the blow core. To facilitate such article removal, the blow mold may be constructed of two or more parts.

The finishing article may be conveniently removed by means of attachment 56, which may also serve the function of removing liner 20 from web 21 or transfer plate 40. It is preferred to utilize such means associated with the injection blow molding apparatus for removing the liner. In attachment 56 plug 57 is carried by platen 58 arranged to slide in the direction of the arrow B upon tie rods 59 under the action of fluid cylinder 60 mounted upon base platen 61. Cylinder 60 is connected to platen 58 by means of piston rod 62. Plug 57 may have a channel 63 terminating at the bottom face thereof, connected to a source of vacuum or compressed air, or alternatingly to both, by means of pipe 64.

In operation, plug 57 is inserted into the blown article in the blow mold when the blow mold is in the discharge position. Vacuum is applied through channel 63 and the bottom of the article is thereby caused to adhere to the bottom face of plug 57. The blow mold is then actuated to release the article and is removed from the path of the plug leaving the article attached thereto. Attachment 58 may then be moved to the location where it is desired to discharge the finished article. The movements of attachment 58 are effected by conventional means, not shown.

After release of the finished article, attachment 58 may be moved by suitable means into alignment with liner 20 carried on web 21, or alternatively carried on transfer plate 40, which liner has been indexed into proper position by means not shown. At that location, plug 57 may be inserted into the liner under action of cylinder 60 as described above, vacuum applied through channel 63 and the liner removed from the web or transfer plate. Plug 58 then carries the liner into alignment with the now empty blow mold. The suction applied through channel 63 causes the liner to adhere to the plug and also removes the liner from the web or transfer plate, the suction being sufficient to break tabs 35 holding the liner to the web. The liner is then inserted into the blow mold and released by ceasing to apply suction, or, if necessary, by applying fluid pressure through channel 63. Plug 57 is removed from the blow mold 54 and the blow mold, with the liner therein, is brought into alignment with the blow core 52, to which the liner is applied in the next step of the operation and the cycle repeated.

Naturally, for high production, a plurality of blow molds and associated apparatus may be operating simultaneously by appropriate arrangement of the blow molds and associated apparatus.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a method of making a hollow composite article wherein a thermoplastic parison is formed in a parison mold around and in conformity with a blow core, with a preformed thermoplastic sleeve between said parison and said core, the parison, sleeve and core being subsequently confined in a blow mold and expanded therein, the improvement comprising: providing a cup-like thermoplastic sleeve on a web of thermoplastic material; partially severing said sleeve from said web while supporting said sleeve on said web so that said sleeve is readily removable therefrom; transferring said partially severed sleeve to said core; injection molding thermoplastic material about said sleeve to form said parison while said sleeve is still attached to said web transferring said parison and said sleeve on said web to a blow molding mold and separating said parison and said sleeve from said web after said parison and said sleeve have been transferred to said blow mold.

2. A method according to claim 1 wherein a plurality of sleeves are formed on said web.

3. A method according to claim 1 wherein said sleeve is held on said web by at least one tab extending from said sleeve to the web, and wherein said sleeve is separated from the web by severing said tab.

4. A method according to claim 1 wherein said web and said sleeve is a laminate of organic plastic materials bonded together over a portion of their contacting surfaces.

5. A method according to claim 4 wherein said web is substantially unbonded, and wherein the unbonded areas of said web are subsequently separated into their component parts for scrap reclamation.

* * * * *